(12) United States Patent
Nishino et al.

(10) Patent No.: US 10,967,931 B2
(45) Date of Patent: Apr. 6, 2021

(54) BRAKE CONTROLLER AND BRAKE SYSTEM

(71) Applicant: SHIMANO Inc., Sakai (JP)

(72) Inventors: Takafumi Nishino, Sakai (JP); Toshihiko Takahashi, Sakai (JP); Daisuke Nago, Sakai (JP); Hitoshi Takayama, Sakai (JP); Masahiro Nakakura, Sakai (JP)

(73) Assignee: Shimano Inc., Sakai (JP)

( * ) Notice: Subject to any disclaimer, the term of this patent is extended or adjusted under 35 U.S.C. 154(b) by 102 days.

(21) Appl. No.: 16/175,632

(22) Filed: Oct. 30, 2018

(65) Prior Publication Data

US 2019/0127018 A1 May 2, 2019

(30) Foreign Application Priority Data

Nov. 2, 2017 (JP) .............................. JP2017-213198

(51) Int. Cl.
| | |
|---|---|
| *B62L 1/02* | (2006.01) |
| *B60T 8/17* | (2006.01) |
| *B62L 3/02* | (2006.01) |
| *B62M 6/55* | (2010.01) |

(52) U.S. Cl.
CPC ................. *B62L 1/02* (2013.01); *B60T 8/17* (2013.01); *B60T 8/1706* (2013.01); *B62L 3/02* (2013.01); *B62M 6/55* (2013.01)

(58) Field of Classification Search
None
See application file for complete search history.

(56) References Cited

U.S. PATENT DOCUMENTS

| | | | |
|---|---|---|---|
| 2007/0281828 A1* | 12/2007 | Rice | A63F 13/245 482/4 |
| 2016/0375955 A1* | 12/2016 | Negoro | B62M 15/00 701/22 |
| 2017/0129341 A1 | 5/2017 | Hosaka et al. | |
| 2017/0182986 A1* | 6/2017 | Dackermann | B60T 8/1706 |
| 2018/0009503 A1* | 1/2018 | Kinpara | B62M 6/50 |
| 2018/0290714 A1* | 10/2018 | Fossato | G06F 1/3287 |
| 2018/0370485 A1* | 12/2018 | Takatsuka | B60R 25/32 |
| 2019/0250619 A1* | 8/2019 | Gillett | H04W 76/14 |
| 2020/0055501 A1* | 2/2020 | Corno | B62L 3/02 |
| 2020/0062227 A1* | 2/2020 | Tohara | B60T 7/12 |

FOREIGN PATENT DOCUMENTS

| | | |
|---|---|---|
| CN | 204264393 U | 4/2015 |
| CN | 105980197 A | 9/2016 |
| CN | 106080935 A | 11/2016 |
| JP | H1170863 A | 3/1999 |
| JP | 2001347981 A | 12/2001 |
| JP | 2017030395 A | 2/2017 |
| JP | 2017088155 A | 5/2017 |
| WO | 2018105718 A1 | 6/2018 |

* cited by examiner

*Primary Examiner* — Tamara L Weber
(74) *Attorney, Agent, or Firm* — Alleman Hall Creasman & Tuttle LLP

(57) ABSTRACT

To provide a brake controller and a brake system that appropriately brake a rotary body of a human-powered vehicle, a brake controller includes one or more processors configured to programmatically control a braking portion of a brake device so that the braking portion brakes a rotary body of the human-powered vehicle based on first information related to travel of the human-powered vehicle, the first information excluding a road surface gradient.

19 Claims, 3 Drawing Sheets

BRAKE CONTROLLER AND BRAKE SYSTEM

BACKGROUND ART

The present disclosure relates to a brake controller and a brake system.

For example, patent document 1 describes a known brake system as a brake system applied to a human-powered vehicle. The brake system includes a braking portion that brakes a rotary body of the human-powered vehicle, an electric drive portion that drives the braking portion, and a brake controller that controls the electric drive portion.

Patent Document 1: Japanese Laid-Open Patent Publication No. 2017-30395

SUMMARY OF THE DISCLOSURE

It is preferred that a rotary body of a human-powered vehicle be appropriately braked.

It is an object of the present disclosure to provide a brake controller and a brake system that appropriately brake a rotary body of a human-powered vehicle.

A brake controller according to a first aspect of the present disclosure comprises one or more processors configured to programmatically control a braking portion of a braking device so that the braking portion brakes a rotary body of a human-powered vehicle based on first information related to travel of the human-powered vehicle, the first information excluding a road surface gradient.

With the brake controller according to the first aspect, the rotary body of the human-powered vehicle is appropriately braked in accordance with the first information.

In accordance with a second aspect of the present disclosure, the brake controller according to the first aspect is configured so that the first information includes information related to a travel speed of the human-powered vehicle.

With the brake controller according to the second aspect, the rotary body of the human-powered vehicle is appropriately braked in accordance with the information related to the travel speed.

In accordance with a third aspect of the present disclosure, the brake controller according to the second aspect is configured to programmatically control the braking portion in a case where the travel speed based on the first information is greater than or equal to a predetermined speed.

With the brake controller according to the third aspect, the speed of the human-powered vehicle is appropriately controlled.

In accordance with a fourth aspect of the present disclosure, the brake controller according to the third aspect is configured so that in the case where the travel speed based on the first information is greater than or equal to the predetermined speed, the brake controller programmatically controls the braking portion so that the travel speed is changed to be less than the predetermined speed.

With the brake controller according to the fourth aspect, the speed of the human-powered vehicle is appropriately controlled.

In accordance with a fifth aspect of the present disclosure, the brake controller according to the third or fourth aspect is further configured to set the predetermined speed.

With the brake controller according to the fifth aspect, the speed of the human-powered vehicle is appropriately controlled.

In accordance with a sixth aspect of the present disclosure, the brake controller according to the fifth aspect is configured to set the predetermined speed based on an input from an input device operated by a user.

With the brake controller according to the sixth aspect, the speed of the human-powered vehicle is appropriately controlled in accordance with a preference of the user.

In accordance with a seventh aspect of the present disclosure, the brake controller according to the fifth aspect is configured to set the predetermined speed based on second information that is related to travel of the human-powered vehicle and is different from the first information.

With the brake controller according to the seventh aspect, the speed of the human-powered vehicle is further appropriately controlled.

In accordance with an eighth aspect of the present disclosure, the brake controller according to any one of the first to seventh aspects is configured so that the brake controller determines an automatic braking mode of the braking portion based on second information that is related to travel of the human-powered vehicle and is different from the first information.

With the brake controller according to the eighth aspect, the automatic braking mode of the braking portion is determined based on the second information. This provides the rider with a natural riding feel.

In accordance with a ninth aspect of the present disclosure, the brake controller according to the seventh or eighth aspect is configured so that the second information includes information related to operation of a brake operating device mounted on the human-powered vehicle.

With the brake controller according to the ninth aspect, the rider is provided with a further natural riding feel.

In accordance with a tenth aspect of the present disclosure, the brake controller according to any one of the seventh to ninth aspects is configured so that the second information includes information related to a road surface state.

With the brake controller according to the tenth aspect, the rider is provided with a further natural riding feel.

In accordance with an eleventh aspect of the present disclosure, the brake controller according to the tenth aspect is configured so that the information related to a road surface state includes information related to a road surface gradient.

With the brake controller according to the eleventh aspect, the rider is provided with a further natural riding feel.

In accordance with a twelfth aspect of the present disclosure, the brake controller according to the tenth or eleventh aspect is configured so that the information related to a road surface state includes information related to a road surface irregularity.

With the brake controller according to the twelfth aspect, the rider is provided with a further natural riding feel.

In accordance with a thirteenth aspect of the present disclosure, the brake controller according to any one of the tenth to twelfth aspects is configured so that the information related to a road surface state includes information related to a road surface friction.

With the brake controller according to the thirteenth aspect, the rider is provided with a further natural riding feel.

In accordance with a fourteenth aspect of the present disclosure, the brake controller according to any one of the seventh to thirteenth aspects is configured so that the second information includes information related to an inclination angle of the human-powered vehicle.

With the brake controller according to the fourteenth aspect, the rider is provided with a further natural riding feel.

In accordance with a fifteenth aspect of the present disclosure, the brake controller according to the fourteenth aspect is configured so that the information related to the inclination angle includes information related to an inclination angle in a front-rear direction of the human-powered vehicle.

With the brake controller according to the fifteenth aspect, the rider is provided with a further natural riding feel.

In accordance with a sixteenth aspect of the present disclosure, the brake controller according to the fourteenth or fifteenth aspect is configured so that the information related to the inclination angle includes information related to an inclination angle in a sideward direction of the human-powered vehicle.

With the brake controller according to the sixteenth aspect, the rider is provided with a further natural riding feel.

In accordance with a seventeenth aspect of the present disclosure, the brake controller according to any one of the seventh to sixteenth aspects is configured so that the second information includes information related to a rotation state of a crank of the human-powered vehicle.

With the brake controller according to the seventeenth aspect, the rider is provided with a further natural riding feel.

In accordance with an eighteenth aspect of the present disclosure, the brake controller according to the seventeenth aspect is configured so that the information related to the rotation state includes information related to a rotation direction of the crank.

With the brake controller according to the eighteenth aspect, the rider is provided with a further natural riding feel.

In accordance with a nineteenth aspect of the present disclosure, the brake controller according to the seventeenth or eighteenth aspect is configured so that the information related to the rotation state includes information related to a rotation speed of the crank.

With the brake controller according to the nineteenth aspect, the rider is provided with a further natural riding feel.

In accordance with a twentieth aspect of the present disclosure, the brake controller according to any one of the seventh to nineteenth aspects is configured so that the second information includes information related to a load on the human-powered vehicle.

With the brake controller according to the twentieth aspect, the rider is provided with a further natural riding feel.

In accordance with a twenty-first aspect of the present disclosure, the brake controller according to the twentieth aspect is configured so that the information related to the load includes information related to a load on a saddle of the human-powered vehicle.

With the brake controller according to the twenty-first aspect, the rider is provided with a further natural riding feel.

In accordance with a twenty-second aspect of the present disclosure, the brake controller according to the twentieth or twenty-first aspect is configured so that the information related to the load includes information related to a load on a pedal of the human-powered vehicle.

With the brake controller according to the twenty-second aspect, the rider is provided with a further natural riding feel.

In accordance with a twenty-third aspect of the present disclosure, the brake controller according to any one of the twentieth to twenty-second aspects is configured so that the information related to the load includes information related to a load on a handlebar of the human-powered vehicle.

With the brake controller according to the twenty-third aspect, the rider is provided with a further natural riding feel.

In accordance with a twenty-fourth aspect of the present disclosure, the brake controller according to any one of the seventh to twenty-third aspects is configured so that the second information includes information related to vibration of the human-powered vehicle.

With the brake controller according to the twenty-fourth aspect, the rider is provided with a further natural riding feel.

In accordance with a twenty-fifth aspect of the present disclosure, the brake controller according to any one of the seventh to twenty-fourth aspects is configured so that the second information includes information related to traction of a drive wheel of the human-powered vehicle.

With the brake controller according to the twenty-fifth aspect, the rider is provided with a further natural riding feel.

A brake system according to a twenty-sixth aspect of the present disclosure includes the brake controller and the brake device including the braking portion and an electric drive portion that drives the braking portion.

With the brake system according to the twenty-sixth aspect, the rotary body of the human-powered vehicle is appropriately braked.

In accordance with a twenty-seventh aspect of the present disclosure, the brake system according to the twenty-sixth aspect is configured so that the electric drive portion includes an electric motor.

With the brake system according to the twenty-seventh aspect, the rotary body of the human-powered vehicle is appropriately braked.

The brake controller and the brake system according to the present disclosure appropriately brake the rotary body of the human-powered vehicle.

EMBODIMENTS OF THE DISCLOSURE

Embodiments

Figure 1:
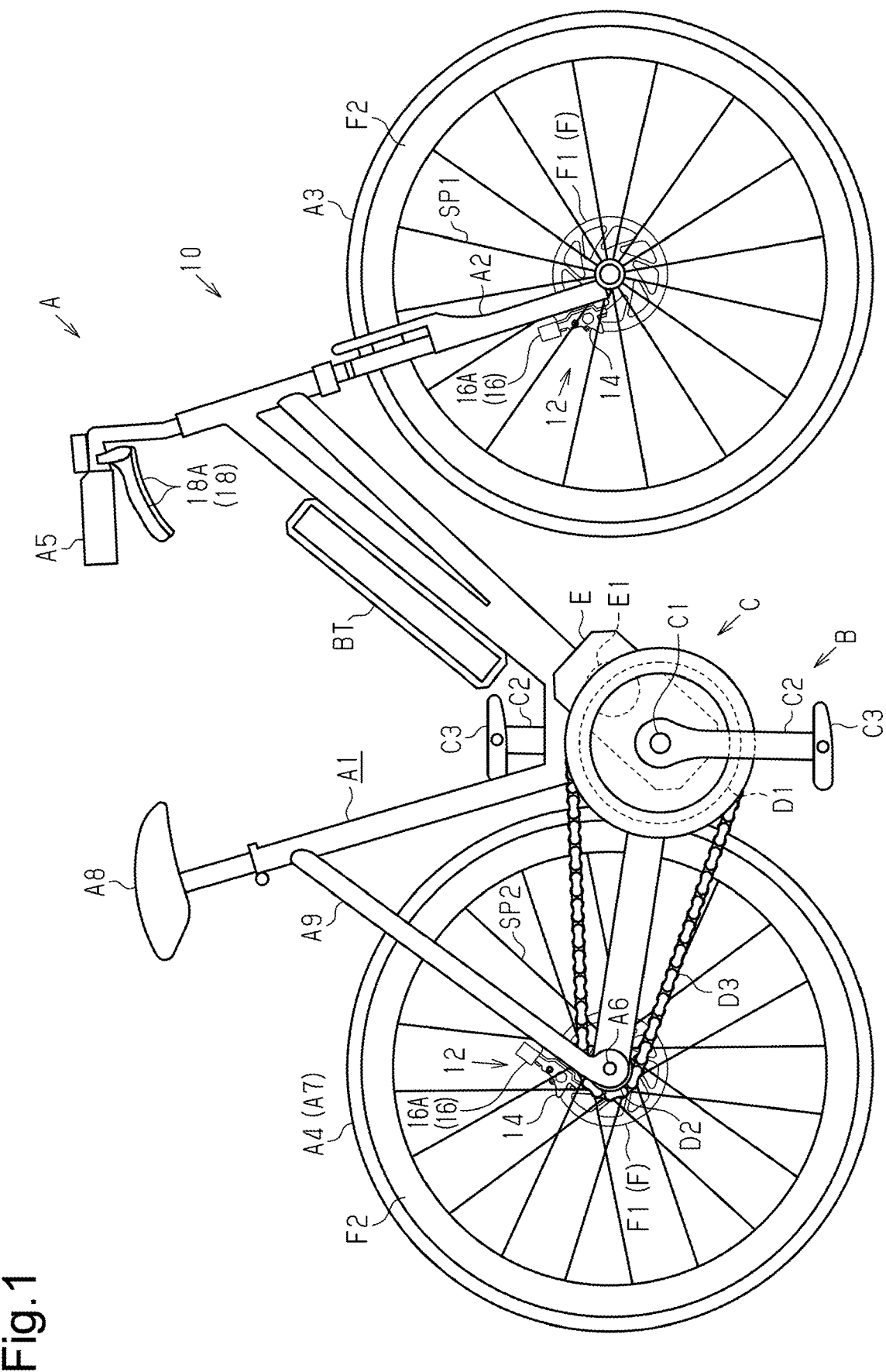
FIG. 1 is a side view of a human-powered vehicle on which one embodiment of a brake system is installed.

A human-powered vehicle A including one embodiment of a brake system 10 according to the present disclosure will now be described with reference to FIG. 1.

Here, the human-powered vehicle means a vehicle that at least partially uses human power as driving power for traveling and includes a vehicle that electrically assists the human power. A vehicle that only uses driving power other than human power is not included in the human-powered vehicle. In particular, a vehicle that solely uses an internal combustion engine as driving power is not included in the human-powered vehicle. The human-powered vehicle is generally assumed to be a compact light vehicle and a vehicle that does not require a license for driving on a public road. The illustrated human-powered vehicle A is a bicycle (e-bike) including an electric assist unit E that assists propulsion of the human-powered vehicle A using electrical energy. More specifically, the illustrated human-powered vehicle A is a city bike. The human-powered vehicle A further includes a frame A1, a front fork A2, a front wheel A3, a rear wheel A4, a handlebar A5, and a drivetrain B.

The drivetrain B is configured to be a chain-drive type. The drivetrain B includes a crank C, a front sprocket D1, a rear sprocket D2, and a chain D3. The crank C includes a crankshaft C1 rotatably supported by the frame A1 and a pair of crank arms C2 respectively provided on two opposite ends of the crankshaft C1. Pedals C3 are rotatably coupled to the distal end of each crank arm C2. The drivetrain B can be selected from any type and can be a belt-drive type or a shaft-drive type.

The front sprocket D1 is provided on the crank C to rotate integrally with the crankshaft C1. The rear sprocket D2 is provided on a hub A6 of the rear wheel A4. The chain D3 runs around the front sprocket D1 and the rear sprocket D2. Driving force, which is applied by the rider of the human-powered vehicle A to the pedals C3, is transmitted via the front sprocket D1, the chain D3, and the rear sprocket D2 to the rear wheel A4. In the present embodiment, the rear wheel A4 is configured to be a drive wheel A7 of the human-powered vehicle A. The front wheel A3 can be configured to be the drive wheel A7 of the human-powered vehicle A.

The human-powered vehicle A further includes the electric assist unit E. The electric assist unit E operates so that propulsion power of the human-powered vehicle A is assisted. The electric assist unit E operates in accordance with, for example, driving force applied to the pedals C3. The electric assist unit E includes an electric motor E1. The electric assist unit E is driven by electric power supplied from a battery BT mounted on the human-powered vehicle A. The electric assist unit E can be omitted from the human-powered vehicle A.

The brake system 10 includes brake devices 12, the number of which corresponds to the number of wheels. In the present embodiment, a brake device 12 corresponding to the front wheel A3 and a brake device 12 corresponding to the rear wheel A4 are provided in the brake system 10. The pair of brake devices 12 has the same configuration. In the present embodiment, the brake devices 12 are disc brake devices that brake rotary bodies F of the human-powered vehicle A. The rotary bodies F are disc brake rotors F1 provided on each of the front wheel A3 and the rear wheel A4 of the human-powered vehicle A. The brake devices 12 can be rim brake devices. In this case, the rotary bodies F are rims F2.

The brake system 10 further includes braking portions 14 that brake the rotary bodies F of the human-powered vehicle A and electric drive portions 16 that drive the braking portions 14. In the present embodiment, the braking portions 14 and the electric drive portions 16 are included in the brake devices 12. Each of the braking portions 14 includes a caliper that clamps the rotary body F. The braking portion 14 is electrically driven by the electric drive portion 16 to brake the rotary body F. The electric drive portion 16 includes an electric motor 16A. The electric motor 16A differs from the electric motor E1 of the electric assist unit E. The electric drive portion 16 is driven by electric power supplied from, for example, the battery BT. In the present embodiment, the electric drive portion 16 is provided in a case of the braking portion 14. In another example, the electric drive portion 16 is provided separately from the braking portion 14. More specifically, the electric drive portion 16 is provided at any location, for example, the frame A1, the front fork A2, or the handlebar A5. In this case, the electric drive portion 16 is configured to supply a fluid such as hydraulic oil to the braking portion 14.

The brake system 10 further includes brake operating devices 18. The brake operating devices 18 are provided at the left side of the handlebar A5 and the right side of the handlebar A5 with respect to a center plane of the human-powered vehicle A. Each of the pair of brake operating devices 18 includes a lever 18A. One of the brake devices 12 is driven in response to operation of the lever 18A of one of the brake operating devices 18. The other of the brake devices 12 is driven in response to operation of the lever 18A of the other of the brake operating devices 18. Alternatively, the brake devices 12 (in the present embodiment, two brake devices 12) can be operated in response to operation of each of the pair of the brake operating devices 18. In this case, the ratio of braking force of one brake device 12 to braking force of the other brake device 12 corresponding to one of the brake operating devices 18 can differ from the ratio of braking force of the one brake device 12 to braking force of the other brake device 12 corresponding to the other of the brake operating devices 18.

Figure 2:
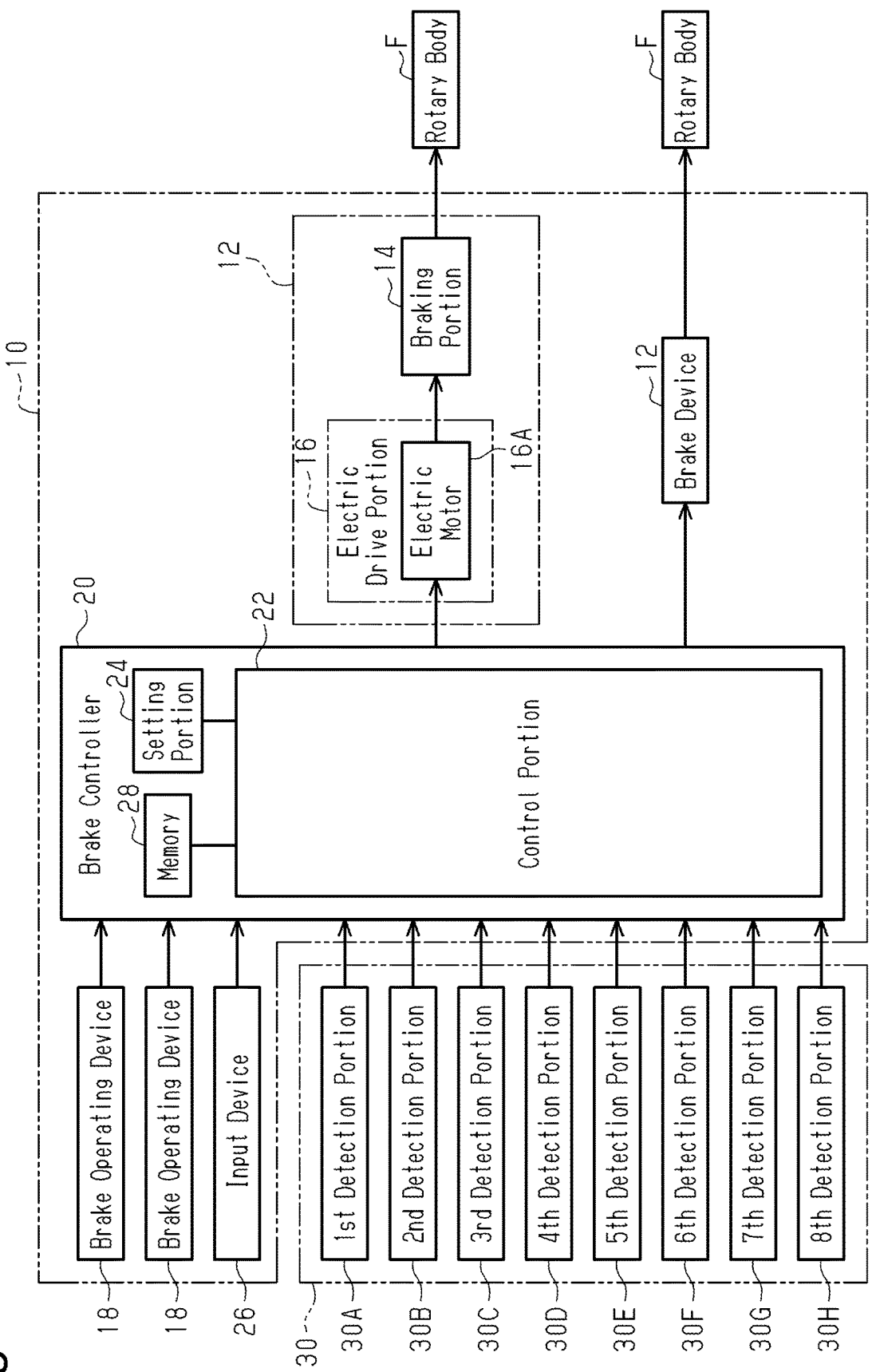
FIG. 2 is a block diagram of the brake system shown in FIG. 1.

As shown in FIG. 2, the brake system 10 further includes a brake controller 20. The brake controller 20 is driven by, for example, electric power supplied from the battery BT. The brake controller 20 automatically (programmatically) controls the braking portions 14 so that the braking portions 14 brake the rotary bodies F of the human-powered vehicle A based on first information I1 related to travel of the human-powered vehicle A excluding a road surface gradient. The first information I1 includes information related to a travel speed TS of the human-powered vehicle A. The information related to the travel speed TS includes at least one of the travel speed TS, a rotation speed of the front wheel A3 or the rear wheel A4, and a combination of a rotation speed CR of the crank C and the gear ratio. In the present embodiment, the information related to the travel speed TS includes the travel speed TS.

The brake controller 20 includes a control portion 22 that controls the braking portions 14 by controlling the electric drive portions 16. The control portion 22 is a processor such as a central processing unit (CPU) or a micro processing unit (MPU). The control portion 22 is provided on at least one of the braking portions 14. More specifically, the control portion 22 is attached to the case of the braking portion 14. In a case where the travel speed TS is greater than or equal to a predetermined speed PS based on the first information I1, the control portion 22 automatically controls the braking portions 14. In a case where the travel speed TS is greater than or equal to the predetermined speed PS based on the first information I1, the control portion 22 automatically controls the braking portions 14 so that the travel speed TS is changed to be less than the predetermined speed PS. In other words, the control portion 22 performs automatic control on the braking portions 14 based on the travel speed TS of the human-powered vehicle A. It is preferred that the predetermined speed PS be included in a range of 40 km/hour to 60 km/hour.

The brake controller 20 further includes a setting portion 24 setting the predetermined speed PS. The setting portion 24 sets the predetermined speed PS in accordance with a first example or a second example described below. In the first example, the setting portion 24 sets the predetermined speed PS based on an input from an input device 26 operated by a user including a rider, a manufacturer, and a mechanic. The input device 26 is provided on the handlebar A5 (refer to FIG. 1). In the present embodiment, a cycle computer mounted on the handlebar A5 functions as the input device 26. The input device 26 can be an external device (not shown). In the second example, the setting portion 24 sets the predetermined speed PS based on second information I2 related to travel of the human-powered vehicle A and different from the first information I1. In this case, the predetermined speed PS is automatically set by the setting portion 24. In the present embodiment, the CPU or MPU that configures the control portion 22 functions as the setting portion 24. Alternatively, the setting portion 24 can be configured by a processor (e.g., CPU or MPU) that differs from the processor of the control portion 22.

The control portion 22 determines an automatic braking mode of the braking portions 14 based on the second information I2 related to the human-powered vehicle A, which is different from the first information I1. In the present embodiment, in a case where the second information I2 does not satisfy a predetermined condition, the control portion 22 is configured not to perform automatic control on the braking portions 14 regardless of the first information I1. The predetermined condition is set in accordance with the second information I2. In a case where the second information I2 does not satisfy the predetermined condition, the control portion 22 controls the braking portions 14 in accordance with, for example, an operation amount S of the brake operating devices 18. In a case where the second information I2 satisfies the predetermined condition, the control portion 22 can perform automatic control on the braking portions 14 so that the braking strength differs from that in a case where the second information I2 does not satisfy the predetermined condition. Additionally, the brake controller 20 can include a switch (not shown) that activates and deactivates the automatic control of the braking portions 14.

The second information I2 includes information related to operation of an operating device mounted on the human-powered vehicle A. The operating device includes the brake operating devices 18, which operate the brake devices 12. In the present embodiment, in a case where there is no input to the brake operating devices 18, the control portion 22 determines that the second information I2 satisfies the predetermined condition. More specifically, in the present embodiment, in a case where it is assumed that the rider has no active intention of applying a brake, the control portion 22 determines that the second information I2 satisfies the predetermined condition.

The second information I2 includes information related to a road surface state RS. The information related to the road surface state RS includes information related to road surface gradient RI. In a case where the road surface gradient RI is greater than or equal to a predetermined gradient or in a case where the road surface gradient RI is less than the predetermined gradient, the control portion 22 determines that the second information I2 satisfies the predetermined condition. In the present embodiment, in a case where the road surface gradient RI is greater than or equal to the predetermined gradient, the control portion 22 determines that the second information I2 satisfies the predetermined condition. More specifically, in the present embodiment, in a case where the human-powered vehicle A is assumed to be traveling on a downward slope having gradient that is greater than or equal to the predetermined gradient, the control portion 22 determines that the second information I2 satisfies the predetermined condition. The information related to the road surface state RS includes information related to a road surface irregularity RU. In a case where the road surface irregularity RU is greater than or equal to a predetermined irregularity or in a case where the road surface irregularity RU is less than the predetermined irregularity, the control portion 22 determines that the second information I2 satisfies the predetermined condition. In the present embodiment, in a case where the road surface irregularity RU is less than the predetermined irregularity, the control portion 22 determines that the second information I2 satisfies the predetermined condition. More specifically, in the present embodiment, in a case where the human-powered vehicle A is assumed to be stably traveling, the control portion 22 determines that the second information I2 satisfies the predetermined condition. The information related to the road surface state RS includes information related to a road surface friction RF. In a case where the road surface friction RF is greater than or equal to a predetermined friction or in a case where the road surface friction RF is less than the predetermined friction, the control portion 22 determines that the second information I2 satisfies the predetermined condition. In the present embodiment, in a case where the road surface friction RF is greater than or equal to the predetermined friction, the control portion 22 determines that the second information I2 satisfies the predetermined condition. More specifically, in the present embodiment, in a case where the road surface is assumed not to be slippery, the control portion 22 determines that the second information I2 satisfies the predetermined condition.

The second information I2 includes information related to an inclination angle IA of the human-powered vehicle A. The inclination angle IA correlates with a road grade. The information related to the inclination angle IA includes information related to an inclination angle in the front-rear direction of the human-powered vehicle A (hereinafter, referred to as "first inclination angle IA1"). In a case where the first inclination angle IA1 is greater than or equal to a first predetermined angle or in a case where the first inclination angle IA1 is less than the first predetermined angle, the control portion 22 determines that the second information I2 satisfies the predetermined condition. In the present embodiment, in a case where the first inclination angle IA1 is greater than or equal to the first predetermined angle, the control portion 22 determines that the second information I2 satisfies the predetermined condition. More specifically, in the present embodiment, in a case where the human-powered vehicle A is assumed to be traveling on a downward slope having gradient that is greater than or equal to the predetermined gradient, the control portion 22 determines that the second information I2 satisfies the predetermined condition. The information related to the inclination angle IA includes information related to an inclination angle in the sideward direction of the human-powered vehicle A (hereinafter, referred to as "second inclination angle IA2"). In a case where the second inclination angle IA2 is greater than or equal to a second predetermined angle or in a case where the second inclination angle IA2 is less than the second predetermined angle, the control portion 22 determines that the second information I2 satisfies the predetermined condition. In the present embodiment, in a case where the second inclination angle IA2 is less than the second predetermined angle, the control portion 22 determines that the second information I2 satisfies the predetermined condition. More specifically, in the present embodiment, in a case where the human-powered vehicle A is assumed to be traveling straight, the control portion 22 determines that the second information I2 satisfies the predetermined condition.

The second information I2 includes information related to a rotation state CS of the crank C of the human-powered vehicle A. The information related to the rotation state CS includes information related to a rotation direction CD of the crank C. In a case where the rotation direction CD is a predetermined rotation direction, the control portion 22 determines that the second information I2 satisfies the predetermined condition. In the present embodiment, in a case where the rotation direction CD of the crank C is a rotation direction for driving the drive wheel A7, the control portion 22 determines that the second information I2 does not satisfy the predetermined condition. More specifically, in the present embodiment, in a case where the rider is rotating the crank C to drive for travel, the control portion 22 determines that the second information I2 does not satisfy the predetermined condition. The information related to the rotation state CS includes information related to the rotation speed CR of the crank C. In a case where the rotation speed CR is greater than or equal to a predetermined rotation speed or in a case where the rotation speed CR is less than the predetermined rotation speed, the control portion 22 determines that the second information I2 satisfies the predetermined condition. In the present embodiment, in a case where the rotation speed CR is less than the predetermined rotation speed, the control portion 22 determines that the second information I2 satisfies the predetermined condition. More specifically, in the present embodiment, in a case where the rider is not rotating the crank C at a speed that is greater than or equal to the predetermined rotation speed to drive for travel, the control portion 22 determines that the second information I2 satisfies the predetermined condition.

The second information I2 includes information related to a load L on the human-powered vehicle A. The load L includes a load applied by the rider to the human-powered vehicle A and reflects the posture of the rider. The information related to the load L includes information related to a load on a saddle A8 (refer to FIG. 1) of the human-powered vehicle A (hereinafter, referred to as "first load L1"). In a case where the first load L1 is greater than or equal to a first predetermined load or in a case where the first load L1 is less than the first predetermined load, the control portion 22 determines that the second information I2 satisfies the predetermined condition. In the present embodiment, in a case where the first load L1 is greater than or equal to the first predetermined load, the control portion 22 determines that the second information I2 satisfies the predetermined condition. More specifically, in the present embodiment, in a case where the rider is assumed to be stably sitting on the saddle A8, the control portion 22 determines that the second information I2 satisfies the predetermined condition. The information related to the load L includes information related to a load on the pedals C3 of the human-powered vehicle A (hereinafter, referred to as "second load L2"). In a case where the second load L2 is greater than or equal to a second predetermined load or in a case where the second load L2 is less than the second predetermined load, the control portion 22 determines that the second information I2 satisfies the predetermined condition. In the present embodiment, in a case where the second load L2 is less than the second predetermined load, the control portion 22 determines that the second information I2 satisfies the predetermined condition. More specifically, in the present embodiment, in a case where the rider is not assumed to be depressing the pedals C3, the control portion 22 determines that the second information I2 satisfies the predetermined condition. The information related to the load L includes information related to a load on the handlebar A5 of the human-powered vehicle A (hereinafter, referred to as "third load L3"). In a case where the third load L3 is greater than or equal to a third predetermined load or in a case where the third load L3 is less than the third predetermined load, the control portion 22 determines that the second information I2 satisfies the predetermined condition. In the present embodiment, in a case where the third load L3 is less than the third predetermined load, the control portion 22 determines that the second information I2 satisfies the predetermined condition. More specifically, in the present embodiment, in a case where the rider is not assumed to be a forward leaning load, the control portion 22 determines that the second information I2 satisfies the predetermined condition.

The second information I2 includes information related to vibration V of the human-powered vehicle A. In a case where the vibration V is greater than or equal to a predetermined vibration or in a case where the vibration V is less than the predetermined vibration, the control portion 22 determines that the second information I2 satisfies the predetermined condition. In the present embodiment, in a case where the vibration V is less than the predetermined vibration, the control portion 22 determines that the second information I2 satisfies the predetermined condition. More specifically, in the present embodiment, in a case where the human-powered vehicle A is assumed to be stably traveling, the control portion 22 determines that the second information I2 satisfies the predetermined condition.

The second information I2 includes information related to traction T of the drive wheel A7 of the human-powered vehicle A. In a case where the traction T is greater than or equal to a predetermined traction or in a case where the traction T is less than the predetermined traction, the control portion 22 determines that the second information I2 satisfies the predetermined condition. In the present embodiment, in a case where the traction T is less than the predetermined traction, the control portion 22 determines that the second information I2 satisfies the predetermined condition. More specifically, in the present embodiment, in a case where it is assumed that the rider has no active intention of driving for travel, the control portion 22 determines that the second information I2 satisfies the predetermined condition.

In the present embodiment, the second information I2 includes at least one of the information related to operation of the operating device, the information related to the road surface state RS, the information related to the inclination angle IA, the information related to the rotation state CS, the information related to the load L, the information related to the vibration V, and the information related to the traction T. The information related to the operating device includes information related to operation of the brake operating devices 18 as described above. The information related to the road surface state RS includes the information related to the road surface gradient RI, the information related to the road surface irregularity RU, and the information related to the friction RF as described above. The information related to the inclination angle IA includes the information related to the first inclination angle IA1 and the information related to the second inclination angle IA2 as described above. The information related to the rotation state CS includes the information related to the rotation direction CD and the information related to the rotation speed CR as described above. The information related to the load L includes the information related to the first load L1, the information related to the second load L2, and the information related to the third load L3 as described above. The control portion 22 can use all of the pieces of information as the second information I2 or can use only some of the pieces of information as the second information I2. The brake controller 20 can be configured to select any piece of the information as the second information I2.

The brake controller 20 further includes a memory 28. The memory 28 includes, for example, a non-volatile memory and a volatile memory. The memory 28 stores information used in various control programs and various arithmetic processes. More specifically, the memory 28 stores information related to the automatic control of the braking portions 14.

The human-powered vehicle A further includes a detection device 30 that detects a state related to the human-powered vehicle A. The detection device 30 sends, for example, various detected information to the brake controller 20. The detection device 30 includes at least one of a first detection portion 30A, a second detection portion 30B, a third detection portion 30C, a fourth detection portion 30D, a fifth detection portion 30E, a sixth detection portion 30F, a seventh detection portion 30G, and an eighth detection portion 30H.

The first detection portion 30A detects the operation amount S of the brake operating devices 18. The operation amount S can be selected from, for example, a rotation amount of the lever 18A with respect to an initial state in which the lever 18A is not operated, a rotation speed of the lever 18A, a rotation acceleration of the lever 18A, an input load of the lever 18A, and a combination of these. The first detection portion 30A includes a sensor (not shown) that detects, for example, at least one of the rotation amount of the lever 18A, the rotation speed of the lever 18A, the rotation acceleration of the lever 18A, and the input load of the lever 18A. In the present embodiment, the first detection portion 30A is provided for each of the brake operating devices 18. In FIG. 2, only one of the first detection portions 30A is shown. The control portion 22 obtains the operation amount S of the brake operating devices 18 and the information related to operation of the brake operating devices 18 based on the detection result of the first detection portions 30A.

The second detection portion 30B detects the travel speed TS of the human-powered vehicle A. The second detection portion 30B includes, for example, a first magnetic sensor (not shown) that detects a magnet (not shown) provided on a spoke SP1 (refer to FIG. 1) of the front wheel A3. In the present embodiment, the second detection portion 30B is provided on the front fork A2. The second detection portion 30B detects the magnet to detect the rotation speed of the front wheel A3 and thus detect the travel speed TS of the human-powered vehicle A. The control portion 22 obtains the information related to the travel speed TS based on the detection result of the second detection portion 30B.

The third detection portion 30C detects the road surface state RS. The third detection portion 30C includes, for example, a camera (not shown) that directly detects the road surface state RS. In the present embodiment, the third detection portion 30C is provided on the frame A1 or the handlebar A5. The control portion 22 obtains the information related to the road surface state RS based on the detection result of the third detection portion 30C. The third detection portion 30C can include at least one of an inclination sensor (not shown) that detects an inclination of the human-powered vehicle A for detection of the road surface gradient RI, a vibration sensor (not shown) that detects vibration of the human-powered vehicle A for detection of the road surface irregularity RU, and a receiver (not shown) that detects external information related to the weather for detection of the road surface friction RF.

The fourth detection portion 30D detects the inclination angle IA of the human-powered vehicle A. The fourth detection portion 30D includes, for example, an inclination sensor (not shown) that detects an inclination of the human-powered vehicle A with respect to a horizontal plane. In the present embodiment, the fourth detection portion 30D is provided on the frame A1. The inclination sensor is realized by, for example, an acceleration sensor. The control portion 22 obtains the information related to the inclination angle IA based on the detection result of the fourth detection portion 30D. More specifically, the control portion 22 obtains the information related to the first inclination angle IA1 and the information related to the second inclination angle IA2 based on the detection result of the fourth detection portion 30D.

The fifth detection portion 30E detects the rotation state CS of the crank C. The fifth detection portion 30E includes, for example, a second magnetic sensor (not shown) that detects a magnet (not shown) provided on the frame A1 or the like. In the present embodiment, the fifth detection portion 30E is provided on one of the crank arms C2. The control portion 22 obtains the information related to the rotation state CS of the crank C based on the detection result of the fifth detection portion 30E. More specifically, the control portion 22 obtains the information related to the rotation speed CR of the crank C based on a detection result of the fifth detection portion 30E and the information related to the rotation direction CD of the crank C based on detection results of the second detection portion 30B and the fifth detection portion 30E.

The sixth detection portion 30F detects the load L on the human-powered vehicle A. The sixth detection portion 30F includes, for example, a first load sensor (not shown) that detects the first load L1, a second load sensor (not shown) that detects the second load L2, and a third load sensor (not shown) that detects the third load L3. In the present embodiment, the first load sensor is provided on the saddle A8, the second load sensor is provided on the pedals C3, and the third load sensor is provided on the handlebar A5. The control portion 22 obtains the information related to the load L based on the detection result of the sixth detection portion 30F.

The seventh detection portion 30G detects the vibration V of the human-powered vehicle A. The seventh detection portion 30G includes, for example, a vibration sensor (not shown) that detects vibration that the human-powered vehicle A receives from the ground. In the present embodiment, the seventh detection portion 30G is provided on the frame A1. The control portion 22 obtains the information related to the vibration V based on the detection result of the seventh detection portion 30G.

The eighth detection portion 30H detects the traction T of the drive wheel A7. The eighth detection portion 30H includes, for example, a third magnetic sensor (not shown) that detects a magnet (not shown) provided on a spoke SP2 (refer to FIG. 1) of the rear wheel A4. In the present embodiment, the eighth detection portion 30H is provided on, for example, a seatstay A9 of the frame A1. The eighth detection portion 30H detects the magnet to detect the rotation speed of the rear wheel A4. The control portion 22 obtains the information related to the traction T of the drive wheel A7 from the difference between the rotation speed of the front wheel A3 and the rotation speed of the rear wheel A4 based on detection results of the second detection portion 30B and the eighth detection portion 30H. Bending of the axle of the drive wheel A7 can be detected and used as the information related to the traction T.

Figure 3:
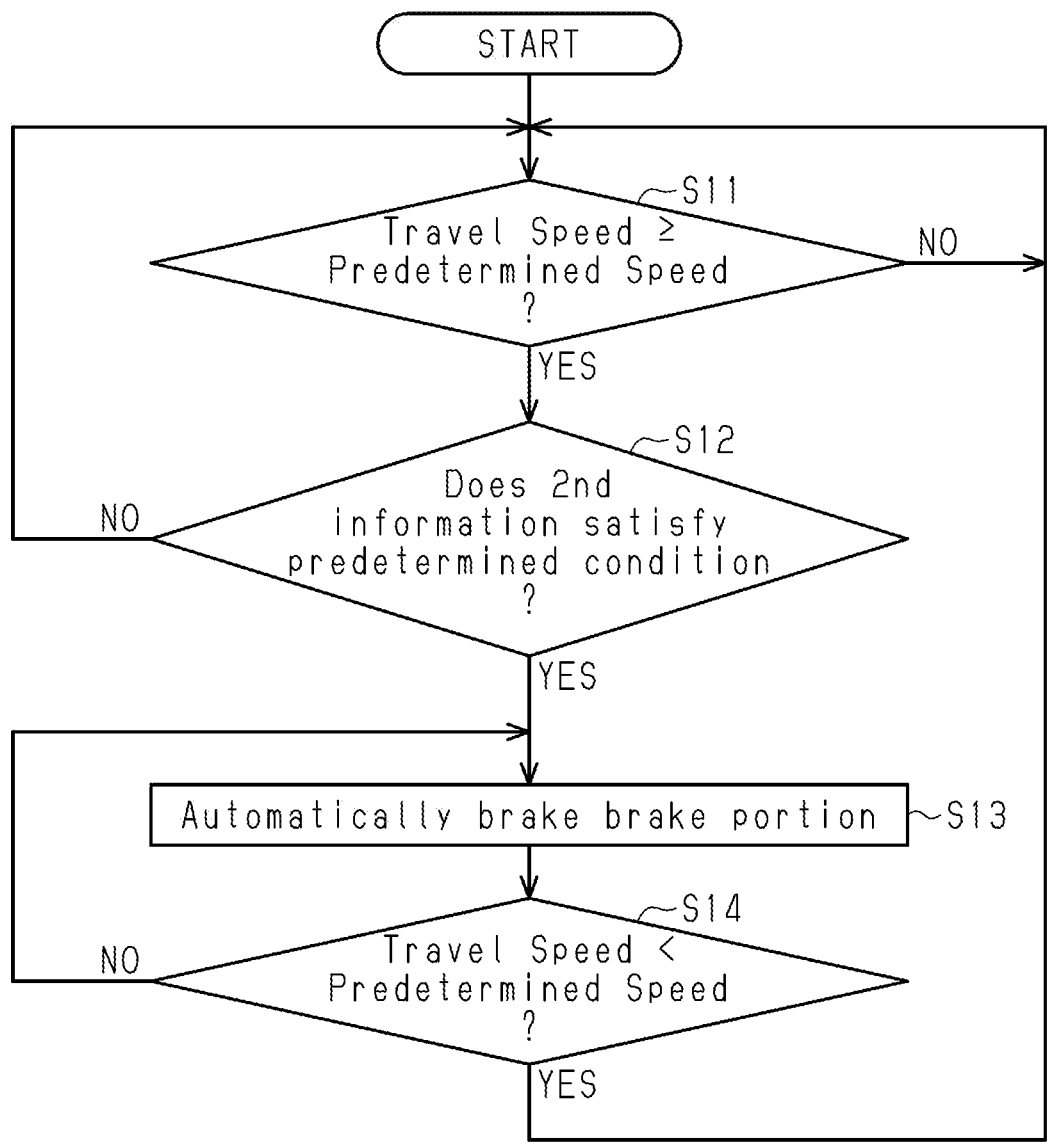
FIG. 3 is a flowchart showing one example of control executed by the brake controller shown in FIG. 2.

One example of automatic control performed by the brake controller 20 on the braking portions 14 will now be described with reference to FIG. 3.

In step S11, the brake controller 20 determines whether or not the travel speed TS is greater than or equal to the predetermined speed PS based on the first information I1. If the brake controller 20 determines that the travel speed TS is less than the predetermined speed PS in step S11, the brake controller 20 repeats step S11. If the brake controller 20 determines that the travel speed TS is greater than or equal to the predetermined speed PS in step S11, the brake controller 20 proceeds to step S12.

In step S12, the brake controller 20 determines whether or not the second information I2 satisfies the predetermined condition. If the brake controller 20 determines that the second information I2 does not satisfy the predetermined condition in step S12, the brake controller 20 returns to step S11. If the brake controller 20 determines that the second information I2 satisfies the predetermined condition in step S12, the brake controller 20 proceeds to step S13. In the automatic control of the braking portions 14, the brake controller 20 can executes step S11 after step S12.

In step S13, the brake controller 20 automatically controls the braking portions 14 so that the travel speed TS is changed to be less than the predetermined speed PS. In step S14, the brake controller 20 determines whether or not the travel speed TS is less than the predetermined speed PS. If the brake controller 20 determines that the travel speed TS is greater than or equal to the predetermined speed PS in step S14, the brake controller 20 returns to step S13. If the brake controller 20 determines that the travel speed TS is less than the predetermined speed PS in step S14, the brake controller 20 returns to step S11 and repeats steps S11 to S14.

Modified Examples

The description related to the above embodiment exemplifies, without any intention to limit, applicable forms of a brake controller and a brake system according to the present disclosure. The brake controller and the brake system according to the present disclosure are applicable to, for example, modified examples of the above embodiment that are described below and combinations of at least two of the modified examples that do not contradict each other. In the following modified examples, the same reference characters are given to those components that are the same as the corresponding components of the embodiment. Such components will not be described in detail.

The control executed by the brake controller 20 can be changed in any manner. In a first example, in a case where the travel speed TS is greater than or equal to the predetermined speed PS based on the first information I1, the brake controller 20 automatically controls the braking portions 14 so that the travel speed TS is maintained at the predetermined speed PS. In a second example, in a case where the travel speed TS is greater than or equal to the predetermined speed PS based on the first information I1, the brake controller 20 automatically controls the braking portions 14 until the brake operating devices 18 are operated by the rider.

The configuration of the brake controller 20 can be changed in any manner. In a first example, the setting portion 24 is omitted from the brake controller 20. In this example, a preset speed is used as the predetermined speed PS. In a second example, the memory 28 is omitted from the brake controller 20.

The configuration of the brake operating devices 18 can be changed in any manner. In one example, the brake operating devices 18 include a button (not shown). The operation amount S of the brake operating devices 18 is a depressed amount of the button with respect to an initial state in which the button is not operated. In this example, the first detection portion 30A includes a displacement sensor (not shown) that detects a displacement of the button with respect to the initial state.

The configuration of the brake system 10 can be changed in any manner. In a first example, the electric drive portions 16 include the electric motor E1 of the electric assist unit E. The electric motor E1 is configured to be regenerative. In this example, the brake devices 12 are regenerative brake devices. In a second example, each of the brake devices 12 includes the braking portion 14, an actuator (not shown) that drives the braking portion 14 with a fluid, and the electric drive portion 16 that drives the actuator (pump). One example of the fluid, which is a power transmission medium, is hydraulic oil. The actuator is driven by the electric drive portion 16, and the pressure of the fluid is applied to the braking portion 14. The braking portions 14 are configured to brake the rotary bodies F of the human-powered vehicle A with the pressure of the fluid. In this example, the brake devices 12 are hydraulic brake devices. In a third example, each of the brake devices 12 includes the braking portion 14, an actuator (not shown) that drives the braking portion 14 with a cable, and the electric drive portion 16 that drives the actuator. The electric drive portion 16 is operated to drive the actuator and pull the cable. The braking portions 14 are configured to brake the rotary bodies F of the human-powered vehicle A in accordance with the pulling of the cables. In this example, the brake devices 12 are cable-type brake devices. In the second and third examples, the braking portion 14, the electric drive portion 16, and the actuator (pump) can be arranged in a signal case or can be arranged on the human-powered vehicle A separately from each other.

The type of the human-powered vehicle A can be changed in any manner. In a first example, the type of the human-powered vehicle A is a road bike, a mountain bike, a trekking bike, a cross bike, a cargo bike, or a recumbent bike. In a second example, the type of the human-powered vehicle A is a kick scooter.

DESCRIPTION OF REFERENCE CHARACTERS 10) brake system, 14) braking portion, 16) electric drive portion, 16A) electric motor, 18) brake operating device (operating device), 20) brake controller, 24) setting portion, 26) input device, A) human-powered vehicle, A5) handlebar, A7) drive wheel, A8) saddle, C) crank, C3) pedal, CD) rotation direction, CR) rotation speed, CS) rotation state, F) rotary body, I1) first information, I2) second information, IA) inclination angle, L) load, PS) predetermined speed, RF) road surface friction, RI) road surface gradient, RS) road surface state, RU) road surface irregularity, T) traction, TS) travel speed, V) vibration

The invention claimed is:
1. A brake controller, comprising:
one or more processors configured to programmatically control a caliper of a brake so that the caliper brakes a rotary body of a human-powered vehicle based on first information related to travel of the human-powered vehicle, the first information excluding a road surface gradient, wherein
the brake controller determines an automatic braking mode of the caliper based on second information that is related to travel of the human-powered vehicle and is different from the first information,
the second information includes one or more of the group consisting of information related to operation of a hand brake mounted on the human-powered vehicle, information related to a road surface state, information related to an inclination angle of the human-powered vehicle, information related to a rotation state of a crank of the human-powered vehicle, information related to a load on the human-powered vehicle, information related to vibration of the human-powered vehicle, and information related to traction of a drive wheel of the human-powered vehicle, and
in a case where the second information does not satisfy a predetermined condition, the brake controller is con- figured to not programmatically control the caliper regardless of the first information.

2. The brake controller according to claim 1, wherein the first information includes information related to a travel speed of the human-powered vehicle.

3. The brake controller according to claim 2, wherein the brake controller programmatically controls the caliper in a case where the travel speed based on the first information is greater than or equal to a predetermined speed.

4. The brake controller according to claim 3, wherein in the case where the travel speed based on the first information is greater than or equal to the predetermined speed, the brake controller programmatically controls the caliper so that the travel speed is changed to be less than the predetermined speed.

5. The brake controller according to claim 3, further configured to set the predetermined speed.

6. The brake controller according to claim 5, wherein the brake controller sets the predetermined speed based on an input from an input device operated by a user.

7. The brake controller according to claim 5, wherein the brake controller sets the predetermined speed based on the second information.

8. The brake controller according to claim 1, wherein the information related to a road surface state includes information related to a road surface gradient.

9. The brake controller according to claim 1, wherein the information related to a road surface state includes information related to a road surface irregularity.

10. The brake controller according to claim 1, wherein the information related to a road surface state includes information related to a road surface friction.

11. The brake controller according to claim 1, wherein the information related to the inclination angle includes information related to an inclination angle in a front-rear direction of the human-powered vehicle.

12. The brake controller according to claim 1, wherein the information related to the inclination angle includes information related to an inclination angle in a sideward direction of the human-powered vehicle.

13. The brake controller according to claim 1, wherein the information related to the rotation state includes information related to a rotation direction of the crank.

14. The brake controller according to claim 1, wherein the information related to the rotation state includes information related to a rotation speed of the crank.

15. The brake controller according to claim 1, wherein the information related to the load includes information related to a load on a saddle of the human-powered vehicle.

16. The brake controller according to claim 1, wherein the information related to the load includes information related to a load on a pedal of the human-powered vehicle.

17. The brake controller according to claim 1, wherein the information related to the load includes information related to a load on a handlebar of the human-powered vehicle.

18. A brake system comprising:
the brake controller according to claim 1; and
the brake, including:
the caliper; and
an electric motor that drives the caliper.

19. The brake controller according to claim 1, further comprising a switch configured to activate or deactivate the programmatic control of the caliper, the switch being operable by a rider of the human-powered vehicle.

* * * * *